(12) United States Patent
Watsen et al.

(10) Patent No.: US 8,078,707 B1
(45) Date of Patent: Dec. 13, 2011

(54) NETWORK MANAGEMENT USING HIERARCHICAL DOMAINS

(75) Inventors: Kent Andrew Watsen, Redwood City, CA (US); Ajit Sancheti, San Francisco, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 1347 days.

(21) Appl. No.: 10/986,159

(22) Filed: Nov. 12, 2004

(51) Int. Cl.
G06F 15/173 (2006.01)
G06F 7/04 (2006.01)
G06F 15/16 (2006.01)
G06F 17/30 (2006.01)
H04L 29/06 (2006.01)

(52) U.S. Cl. ............................. 709/223; 709/224; 726/4

(58) Field of Classification Search .................. 709/223, 709/224, 225, 226, 229; 726/4
See application file for complete search history.

(56) References Cited

U.S. PATENT DOCUMENTS

| | | | | |
|---|---|---|---|---|
| 5,797,128 | A * | 8/1998 | Birnbaum .......................... | 707/5 |
| 5,907,844 | A * | 5/1999 | Guay et al. ..................... | 707/100 |
| 6,031,990 | A * | 2/2000 | Sivakumar et al. ........... | 717/124 |
| 6,041,347 | A * | 3/2000 | Harsham et al. .............. | 709/220 |
| 6,041,374 | A * | 3/2000 | Postman et al. ................ | 710/73 |
| 6,064,656 | A * | 5/2000 | Angal et al. .................... | 370/254 |
| 6,158,010 | A * | 12/2000 | Moriconi et al. ................. | 726/1 |
| 6,219,829 | B1 * | 4/2001 | Sivakumar et al. ........... | 717/131 |
| 6,226,745 | B1 * | 5/2001 | Wiederhold ..................... | 726/1 |
| 6,233,686 | B1 * | 5/2001 | Zenchelsky et al. ............. | 726/1 |
| 6,237,036 | B1 * | 5/2001 | Ueno et al. ..................... | 709/225 |
| 6,446,077 | B2 * | 9/2002 | Straube et al. ............. | 707/103 Y |
| 6,985,955 | B2 * | 1/2006 | Gullotta et al. ............... | 709/229 |
| 7,103,784 | B1 * | 9/2006 | Brown et al. ..................... | 726/9 |
| 7,194,764 | B2 * | 3/2007 | Martherus et al. ................ | 726/8 |
| 7,219,142 | B1 * | 5/2007 | Parekh et al. ................. | 709/223 |
| 7,269,727 | B1 * | 9/2007 | Mukherjee et al. ........... | 713/160 |
| 7,912,971 | B1 * | 3/2011 | Dunn ............................ | 709/229 |
| 2001/0007133 | A1 * | 7/2001 | Moriconi et al. .............. | 713/201 |
| 2002/0095499 | A1 * | 7/2002 | Barnett et al. ................ | 709/226 |
| 2002/0112155 | A1 * | 8/2002 | Martherus et al. ............ | 713/155 |
| 2002/0147801 | A1 * | 10/2002 | Gullotta et al. ............... | 709/223 |
| 2003/0115322 | A1 * | 6/2003 | Moriconi et al. ............. | 709/224 |
| 2006/0129942 | A1 * | 6/2006 | McCary ........................ | 715/741 |
| 2007/0214497 | A1 * | 9/2007 | Montgomery et al. ........... | 726/4 |

OTHER PUBLICATIONS

"GrIDS—A Graph Based Intrusion Detection System for Large Networks"—Published 1996, University of California, Davis by Steven Cheung, Rick Crawford, Mark Dilger, Jermey Frank, Jim Hoagland, Karl Levitt, Jeff Rowe, Stuart Staniford-Chen, Raymond Yip and Dan Zerkle.*
"Telecomunications Security Guidelines for Telecommunications Management Network"—Published 1995 by John Kimmins, Charles Dinkel and Dale Walters.*
"Enhanced Telecon Operations Map (eTOM) the Business Process Framework for the Information and Communications Service Industry" Published Nov. 2003 by the TeleManagement Forum.*
Staniford-Chen et al. "GrIDs—A Graph Based Intrusion Detection System for Large Networks." [Retrieved form the Interned on Dec. 18, 2010] <URL: http://citeseerx.ist.psu.edu/viewdoc/summary?doi=10.1.1.134.516>.* Sandhu et al. "Role-Based Access Control Models." Copyright 1996. <URL:http://profsandhu.com/journals/computer/i94rbac(org).pdf>.*
Zope; What is Zope?; www.zope.org; Mar. 15, 2005 (print date); 3 pages.

* cited by examiner

*Primary Examiner* — Joseph Avellino
*Assistant Examiner* — James Baron
(74) *Attorney, Agent, or Firm* — Harrity & Harrity, LLP

(57) ABSTRACT

A system manages a network that includes devices, administrators, and objects. The system forms a hierarchical tree of domains that semantically organize the network, where each of the domains includes logical groupings of the devices, the administrators, or the objects. The system manages the network based on the hierarchical tree of domains.

24 Claims, 6 Drawing Sheets

NETWORK MANAGEMENT USING HIERARCHICAL DOMAINS

BACKGROUND

1. Field of the Invention

Implementations consistent with the principles of the invention relate generally to device management and, more particularly, to the use of hierarchical domains to manage devices.

2. Description of Related Art

All networks are different, but each network is typically built the same way. For example, a network is designed, the necessary equipment is purchased, and the network components are built and customized to operate in a particular way. In an ideal world, that would be the end of the job—the perfect network has perfect uptime, with perfect redundancy, growth potential, etc. The reality is that managing network devices is fast-becoming a full-time job. Ensuring that all devices in the system are up and running, patched against vulnerabilities and exploits, and functioning as expected requires a team of intelligent and committed individuals who understand every aspect of the network. To respond quickly and appropriately to a network situation, information technology (IT) administrators, network administrators, and security administrators need complete control over network connectivity, network access, and network traffic flow.

As the network grows, individual device maintenance can quickly become a logistical nightmare. New devices, new networking technologies, software upgrades—almost every change to the network requires some human and monetary resource. Even in small networks, setting up and maintaining each device individually is time-consuming, prone to error, and likely to require network downtime. Many organizations are now turning towards integrated management solutions to help them configure and manage devices more efficiently.

SUMMARY

According to one aspect, a method for managing a network that includes devices, administrators, and objects is provided. The method may include forming a hierarchical tree of domains that semantically organize the network, where each of the domains includes logical groupings of the devices, the administrators, or the objects; and managing the network based on the hierarchical tree of domains.

According to another aspect, a system for managing a network that includes devices and administrators associated with one or more entities is provided. The system may include means for generating a hierarchical tree of domains that reflect a structure of the one or more entities, where the domains include logical groupings of the devices and the administrators. The system may also include means for managing the network based on the hierarchical tree of domains.

According to yet another aspect, a management system may include a memory and a processor. The memory may store a hierarchical tree of domains that resemble a structure of an entity, where the domains include logical groupings of devices, administrators, and objects associated with the entity. The processor may identify an activity that one of the administrators can perform within one of the domains, where the domain is related to a child domain in the hierarchical tree. The processor may permit the administrator to perform the activity in the domain and the child domain.

According to a further aspect, a management system may include a memory and a processor. The memory may store a hierarchical tree of domains that resemble a structure of an entity, where the domains include logical groupings of devices, administrators, and objects associated with the entity. The processor may identify one of the objects as shared within one of the domains, where the domain is related to a child domain in the hierarchical tree. The processor may permit the child domain to use the object.

According to another aspect, a management system may include a memory and a processor. The memory may store a hierarchical tree of domains that resemble a structure of an entity, where the domains include logical groupings of devices, administrators, and objects associated with the entity. The processor may identify an expression within one of the domains, where the domain is related to a child domain in the hierarchical tree. The processor may impose the expression on the child domain.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following detailed description of the invention refers to the accompanying drawings. The same reference numbers in different drawings may identify the same or similar elements. Also, the following detailed description does not limit the invention. Instead, the scope of the invention is defined by the appended claims and equivalents.

Systems and methods consistent with the principles of the invention may facilitate the management of network devices associated with one or more entities (e.g., companies, groups, organizations, etc.). The systems and methods may use hierarchical domains to form an organizational delegation model. The organizational delegation model may encode the notion of the structure of an entity, which may reflect the structure of a network associated with the entity, geographical locations associated with the entity, organizations making up the entity, or any other logical representation identified by the entity. For example, an entity may include devices in different locations, and/or associated with different divisions, offices, groups, or departments.

Exemplary Network

Figure 1:
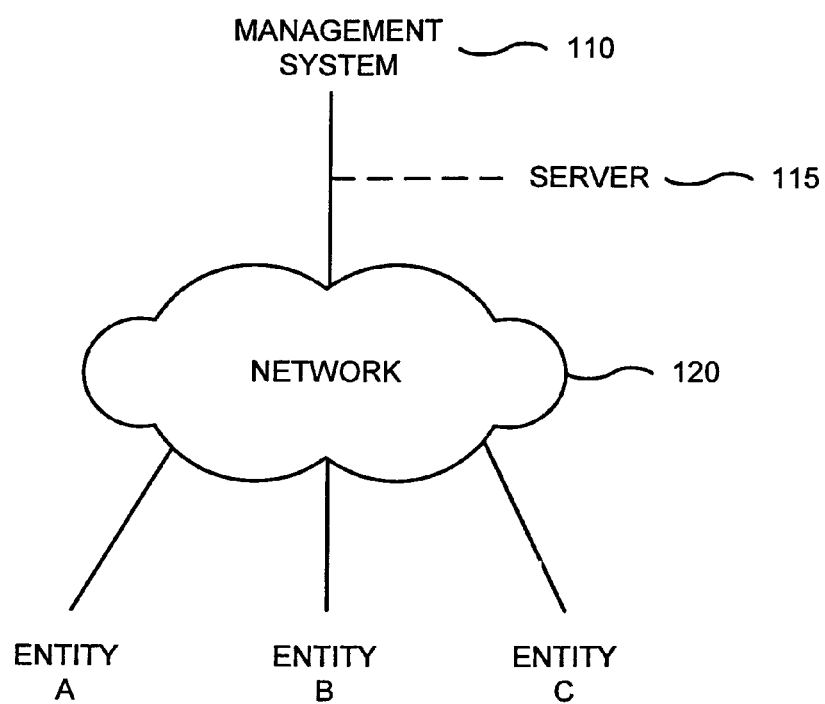
FIG. 1 is an exemplary diagram of a network in which systems and methods consistent with the principles of the invention may be implemented.

FIG. 1 is an exemplary diagram of a network 100 in which systems and methods consistent with the principles of the invention may be implemented. Network 100 may include a management system 110 connected to devices associated with different entities A-C via a network 120. While FIG. 1 shows that network 100 includes a single management system 110 and three entities A-C connected via a single network 120, in practice, network 100 may include more or fewer, management systems, entities, and networks.

Network 120 may include any type of network, such as a wide area network (WAN), a local area network (LAN), an intranet, the Internet, or a telephone network (e.g., the Public Switched Telephone Network (PSTN)). Alternatively, network 120 may include a combination of networks.

Management system 110 may be implemented within a device, such as a computer, or a combination of devices, such as a combination of computers. Management system 110 may provide functionality to integrate management of devices associated with entities A-C. For example, management system 110 may permit an administrator to identify, configure, manage, monitor, and/or generate reports with regard to devices associated with entities A-C.

In one implementation, management system 110 may permit co-management of devices associated with entities A-C. Co-management means that not only may management system 110 manage devices associated with entities A-C, but management system 110 may permit entities A-C to manage their own devices. For example, an entity may manage its own devices via a network interface (e.g., a web interface) to management system 110 or by installing an application that facilitates device management.

In one implementation, management system 110 includes a server 115 that may store data for the devices associated with entities A-C. Management system 110 may use the data in server 115 to identify, configure, manage, monitor, and/or generate reports with regard to devices associated with entities A-C. Entities A-C may make use of data associated with their respective devices to identify, configure, manage, monitor, and/or generate reports with regard to their respective devices.

Each of entities A-C may represent any type of group or association, such as a company or an organization. Each of entities A-C may include one or more offices in one or more locations and one or more devices in each office and/or location. Each office and/or location may identify, configure, manage, monitor, and/or generate reports with regard to its own set of devices.

Figure 2:
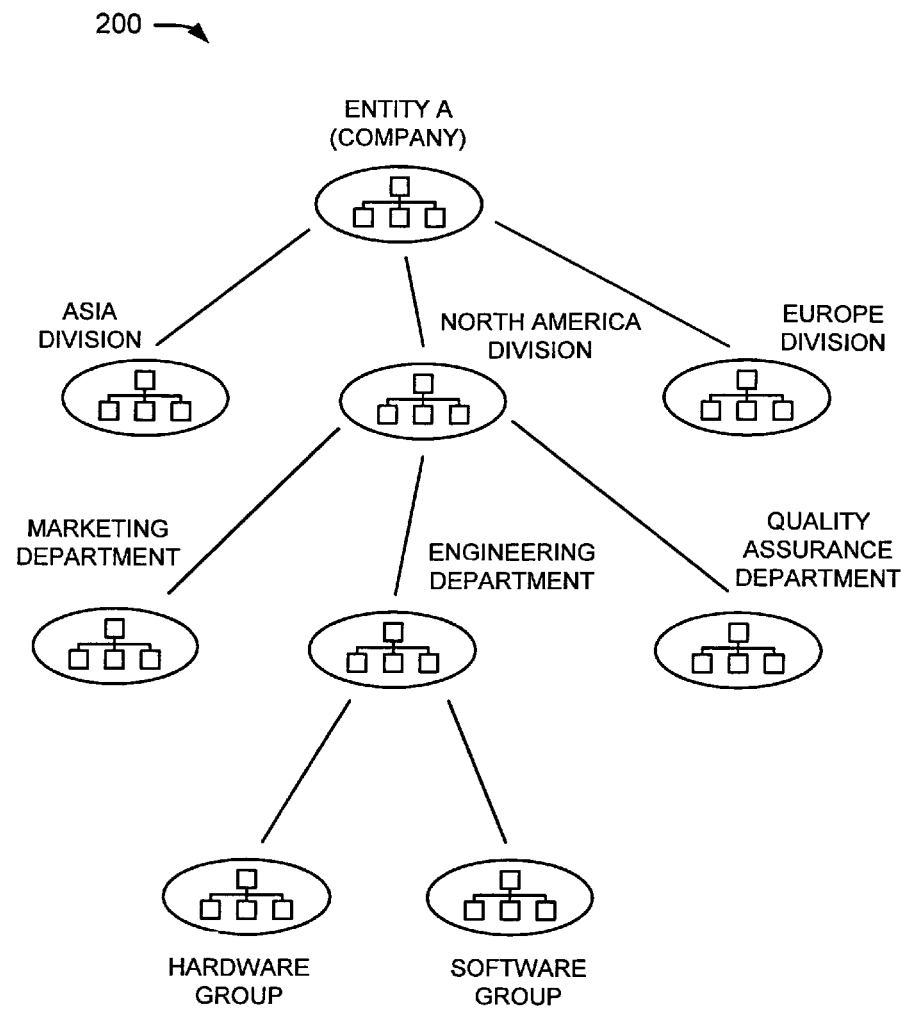
FIG. 2 is an exemplary block diagram of a network that may be associated with an entity of FIG. 1.

FIG. 2 is an exemplary block diagram of a network 200 that may be associated with an entity, such as entity A. Network 200 may include a collection of devices associated with different portions of entity A. As shown in FIG. 2, entity A may include divisions (Asia, North America, and Europe), departments (marketing, engineering, and quality assurance), and groups (hardware and software). While FIG. 2 shows a particular number of divisions, departments, and groups, an entity, in practice, may include more, fewer, or no divisions, departments, and/or groups. Also, the labels "division," "department," and "group" are not intended to convey any special meaning or to imply that a department must be located within a division or that a group must be located within a department. In fact, these labels may be used interchangeably without departing from the spirit of the invention. Also, the names associated with the divisions, departments; and groups are provided merely as examples.

In one implementation, entity A connects to management system 110 via network 120, as shown in FIG. 1, to identify, configure, manage, monitor, and/or generate reports with regard to its set of devices. In another implementation, entity A includes a management system, similar to management system 110, to identify, configure, manage, monitor, and/or generate reports with regard to its set of devices.

As shown in FIG. 2, entity A corresponds to a company with an Asia division, a North America division, and a Europe division. The Asia division may be located somewhere in Asia; the North America division may be located somewhere in North America; and the Europe division may be located somewhere in Europe. These divisions may act as independent business units, but in fact, may be connected in the sense that they are all divisions of the same company.

The North America division may include three departments: a marketing department, an engineering department, and a quality assurance department. These departments may be located in the same or a different physical location. The engineering department may include a hardware group and a software group. These groups may be located in the same or a different physical location.

Associated with the company and each of these divisions, departments, and groups may be a set of devices. These devices might include any network device that can be remotely controlled and/or monitored. In one implementation, the network devices might include security devices (e.g., devices that perform firewall, virtual private network (VPN), denial of service (DoS) protection, traffic management processing, and/or other security-related processing), other types of devices that may permit access to network 200, control access to data within network 200, and/or protect network 200 against malicious traffic or other forms of attack, personal computers, and/or other types of computation or communication devices.

The devices associated with the company, divisions, departments, and groups may connect via any type of connection mechanism. For example, the devices may connect via wired, wireless, and/or optical connections. Alternatively or additionally, the devices may connect via a network, such as a WAN, a LAN, an intranet, the Internet, a telephone network (e.g., the PSTN), or a combination of networks.

At least some of the devices might control access to network 200 from outside of network 200. The devices might also control access to particular types of data within network 200. For example, a device might limit access to marketing-sensitive data to the marketing department. Similarly, a device might limit access to source code to the engineering department, or perhaps, the software group within the engineering department.

Exemplary Device Configuration

Figure 3:
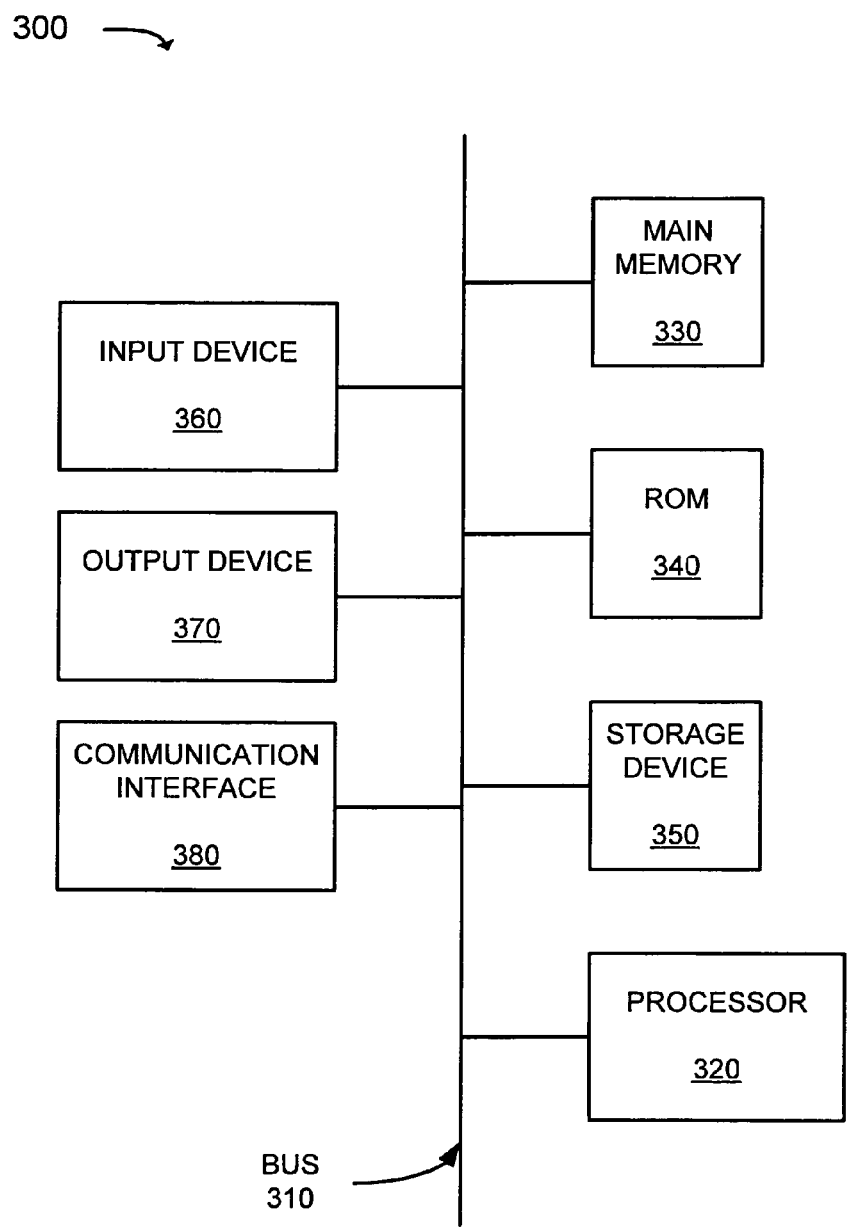
FIG. 3 is an exemplary diagram of a device that may be associated with the management system, the server, and/or an entity of FIG. 1 according to an implementation consistent with the principles of the invention.

FIG. 3 is an exemplary diagram of a device 300 that may be associated with management system 110 (FIG. 1), server 115, and/or an entity, such as entity A, B, or C, according to an implementation consistent with the principles of the invention. While FIG. 3 shows device 300 as including certain elements, other forms of device 300 may include more, fewer, or different types of elements.

As illustrated, device 300 may include a bus 310, a processor 320, a main memory 330, a read only memory (ROM) 340, a storage device 350, an input device 360, an output device 370, and a communication interface 380. Bus 310 may permit communication among the elements of device 300.

Processor 320 may include a conventional processor, microprocessor, or processing logic that may interpret and execute instructions. Main memory 330 may include a random access memory (RAM) or another type of dynamic storage device that may store information and instructions for execution by processor 320. ROM 340 may include a conventional ROM device or another type of static storage device that may store static information and instructions for use by processor 320. Storage device 350 may include a magnetic and/or optical recording medium and its corresponding drive.

Input device 360 may include a conventional mechanism that permits an administrator to input information to device 300, such as a keyboard, a mouse, a keypad, a pen, voice recognition and/or biometric mechanisms, etc. Output device 370 may include a conventional mechanism that outputs information to the administrator, including a display, a printer, a speaker, etc. Communication interface 380 may include any transceiver-like mechanism that enables device 300 to communicate with other devices and/or systems.

Device 300 may perform certain processes in response to processor 320 executing software instructions contained in a computer-readable medium, such as memory 330. A computer-readable medium may be defined as a physical or logical memory device and/or carrier wave. The software instructions may be read into memory 330 from another computer-readable medium, such as storage device 350, or from another device via communication interface 380. The software instructions contained in memory 330 may cause processor 320 to perform processes that will be described later. Alternatively, hardwired circuitry may be used in place of or in combination with software instructions to implement processes consistent with the principles of the invention. Thus, implementations consistent with the principles of the invention are not limited to any specific combination of hardware circuitry and software.

Exemplary Hierarchical Modeling

Implementations consistent with the principles of the invention may model a network while maintaining the notion of the structure of the entities in the network. In one implementation, the model is created and/or maintained by management system 110. The model may be based on a hierarchical tree of domains that semantically organize every aspect of the network, including devices, administrators, and objects. Each domain may have zero or more associated devices, zero or more associated administrators, and zero or more associated objects. An object may be defined as a data structure with one or more sub-fields that may represent reusable information, such as network addresses, individual administrators, administrator groups, and commonly used configuration data.

The model for a network may include one or more domains. Multiple domains may be used for two reasons: (1) to define the structure of an entity or a group of entities; and (2) to control administrator access. Multiple domains may help separate large, geographically distant portions of an entity into smaller, more manageable sections, and to control administrative access to individual sections.

A small entity may include a single domain for their entire network. A large, international entity, on the other hand, might have dozens of domains to represent each of its regional networks across the world. The domains, in this latter situation, may be arranged in a hierarchical tree structure similar to the structure of the entity (see, for example, FIG. 2). In the description to follow, a "parent domain" may refer to any higher level domain in the same branch of the hierarchical tree and a "child domain" may refer to any lower level domain in the same branch of the hierarchical tree.

Figure 4:
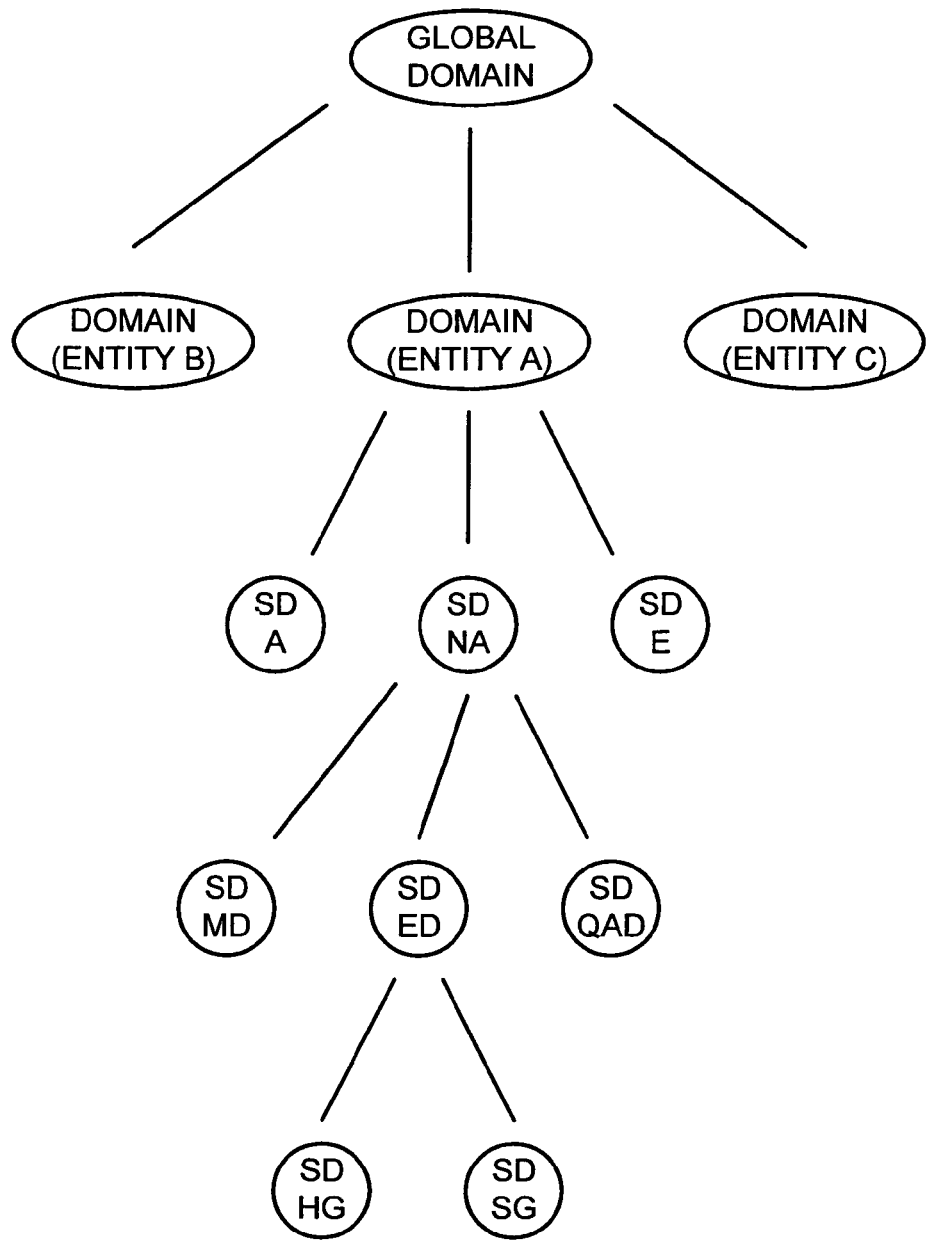
FIG. 4 is an exemplary diagram of a hierarchical model corresponding to the network of FIG. 1.

FIG. 4 is an exemplary diagram of a hierarchical model corresponding to the network of FIG. 1. As shown in FIG. 4, the hierarchical model is based on a hierarchy of domains. The hierarchical model may include a global domain possibly associated with management system 110, a domain associated with each of entity A, B, and C, subdomains associated with the Asia, North America, and Europe divisions of entity A, subdomains associated with the marketing, engineering, and quality assurance departments of entity A, and subdomains associated with the hardware and software groups of entity A. Each of the subdomains may be independent of each other and, at the same time, related to each other in the sense that they are all part of the same parent domain (i.e., the entity A domain).

Semantic relationships may exist between domains in the same branch of the hierarchical tree. One semantic relationship may be related to recursive permissions, which means that if an administrator has permission to perform an activity at a parent domain, then the administrator also has permission to perform the activity at any of the child domains. Another semantic relationship may be related to object acquisition, which means that if an object is defined at a parent domain, then the object can be used by any of the child domains. A further semantic relationship may be related to imposition, which means that a parent domain can impose constraints on a child domain. Other semantic relationships may also exist.

Recursive Permissions

Permissions specify the exact activities that administrators can perform within a domain. There may be hundreds (or more) possible activities that an administrator can perform within a domain. The permissions may specify which of these activities, if any, the administrator can perform.

Figure 5:
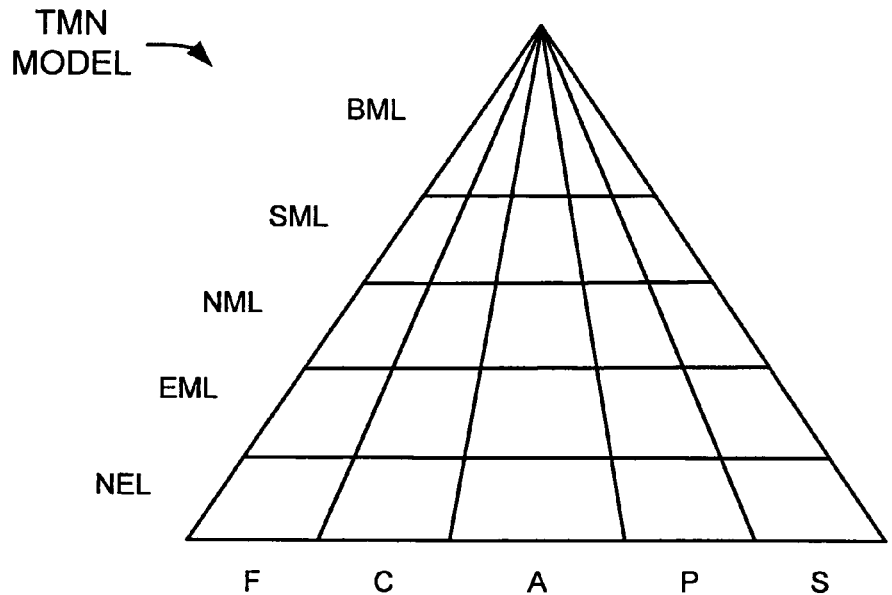
FIG. 5 is a diagram of a Telecommunications Management Network model.

There are several ways to define the activities that can be performed within a domain. One such way is based on the well-known Telecommunications Management Network (TMN) model. FIG. 5 is a diagram of the TMN model. The TMN model is based on a set of verticals and a set of horizontals.

The verticals are labeled FCAPS, where F refers to fault management, C refers to configuration management, A refers to accounting management, P refers to performance management, and S refers to security management. Fault management involves identifying and correcting network problems and faults. Configuration management involves locating resources, including failed resources, and keeping track of the types of resources and their details. Accounting management involves tracking service usage and informing relevant users and authorities about the usage of resources and the costs associated with their usage. Performance management involves gathering network statistics, evaluating system performance under both normal and degraded conditions and altering system modes of operation. Security management involves ensuring legitimate use and maintaining confidentiality, data integrity, and auditability.

The horizontals are labeled BML, SML, NML, EML, and NEL, where BML refers to a business management layer, SML refers to a service management layer, NML refers to a network management layer, EML refers to an element management layer, and NEL refers to a network element layer. The business management layer refers to functions, such as budgeting and billing. The service management layer refers to service functions, such as assuring service level agreements and maintaining quality of service. The network management layer refers to functions, such as path management, topology management, and fault isolation. The element management layer refers to device level configuration and fault and performance management functions. The network element layer refers to logical elements within a network.

The intersections of the verticals and horizontals may define certain activities that may be associated with a domain. Permissions may be granted to administrators based on these intersections to permit administrators to perform particular types of activities within a domain.

Figure 6:
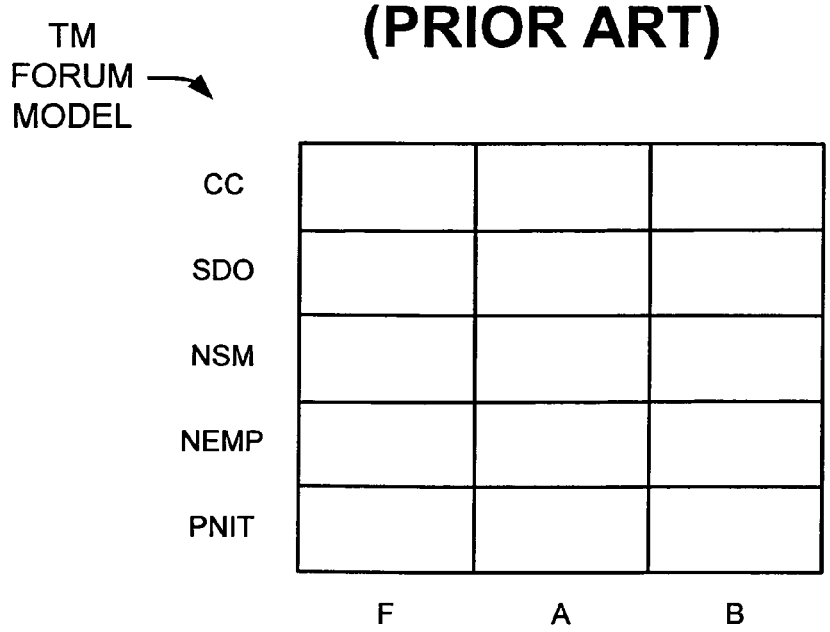
FIG. 6 is a diagram of a Tele-Management Forum model.

Another way to define the activities that can be performed within a domain may be based on the well-known Tele-Management (TM) Forum model. FIG. 6 is a diagram of the TM Forum model. The TM Forum model is based on a set of verticals and a set of horizontals.

The verticals are labeled FAB, where F refers to fulfillment, A refers to assurance, and B refers to billing. Fulfillment is concerned with setting up customers' service. Assurance is concerned with guaranteeing that services are performed as specified. Billing is concerned with billing or paying for provided services.

The horizontals are labeled CC, SDO, NSM, NEMP, and PNIT, where CC refers to customer care, SDO refers to service development and operation, NSM refers to network and systems management, NEMP refers to network element management processes, and PNIT refers to physical network and information technology. Customer care is concerned with customer relationship management. Service development and operation is concerned with service configuration, activation, and management. Network and systems management is concerned with resource provisioning, allocation, and management. Network element management processes is concerned with the network planning, provisioning, and management. Physical network and information technology refers to the physical network and the technology used.

Similar to the TMS model, the intersections of the verticals and horizontals may define certain activities that may be associated with a domain. Permissions may be granted to administrators based on these intersections to permit administrators to perform particular types of activities within a domain.

Permissions granted to the administrators are recursive in that any activity that an administrator is assigned at a domain is recursively applied to its child domains (if any). For example, assume that administrator Bob is assigned the activity of viewing logs in the engineering department subdomain in FIG. 4 and the activity of configuring devices in the quality assurance department subdomain in FIG. 4. In this case, Bob can view logs in the engineering department subdomain and the hardware group and software group subdomains, but cannot view logs in any other domain. Bob can also configure devices in the quality assurance department subdomain, but cannot configure devices in any other domain.

When a permission granted to an administrator includes the ability to add new administrators, the administrator cannot give a new administrator anything more in the way of permissions than the administrator has herself. For example, assume that administrator Mary is assigned the activity of creating new administrators and viewing logs in the marketing department subdomain in FIG. 4. In this case, Mary cannot give new administrators the ability to do anything but view logs in the marketing department subdomain.

Figure 7:
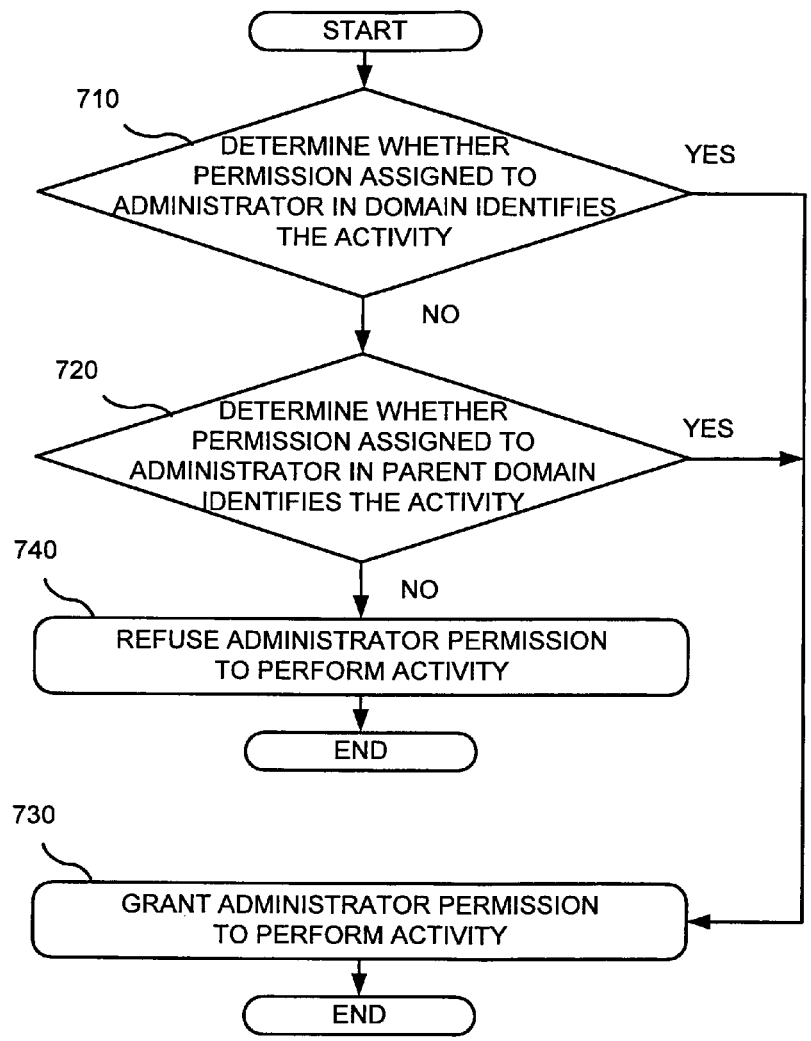
FIG. 7 is a flowchart of exemplary processing for determining whether an administrator has permission to perform an activity within a domain according to an implementation consistent with the principles of the invention.

FIG. 7 is a flowchart of exemplary processing for determining whether an administrator has permission to perform an activity within a domain according to an implementation consistent with the principles of the invention. When an administrator attempts to perform an activity within a domain, it may be determined whether the administrator has permission to perform the activity. This determination may involve determining whether a permission assigned to the administrator in the domain identifies the activity (block 710). This determination may also involve determining whether a permission assigned to the administrator in a parent domain identifies the activity (block 720). While blocks 710 and 720 are described as separate determinations, they may be a single determination, where an administrator's permissions regarding a domain may be the union of the administrator's permissions assigned for that domain and any parent domain(s).

If a permission assigned to the administrator either in the domain or a parent domain identifies the activity, then the administrator is permitted to perform the activity within the domain (block 730). Otherwise, the administrator is refused permission to perform the activity within the domain (block 740).

Object Acquisition

Objects may be declared as shared objects within a domain. Shared objects can be shared by all devices in the same domain. An object that is declared as shared within a domain can also be used by devices in all child domains related to the domain. An object can be used multiple times in the same domain. For example, assume that an address object is created to represent a host, such as an individual workstation. The address object may also be used in a VPN resource and/or as the source or destination in a firewall policy rule.

Assume that the entity A domain in FIG. 4 declares a device object that provides configuration information for a particular type of device as shared. This means that not only can other devices in the entity A domain use the configuration information in the device object, but so can devices associated with the child domains related to the entity A domain, such as the subdomains associated with the Asia, North America, and Europe divisions of entity A, the subdomains associated with the marketing, engineering, and quality assurance departments of entity A, and the subdomains associated with the hardware and software groups of entity A. Accordingly, the objects associated with a domain may include those objects declared within the domain and the collection of shared objects declared within parent domains in the hierarchy.

As stated above, a child domain may make use of a shared object from a parent domain. Use of the shared object by the child domain is valid for the lifetime of the child domain. If the parent domain changes the shared object, the change is reflected in the child domain.

Imposition

A domain can impose expressions, such as rules, configuration parameters, login controls, and other forms of constraints, on its child domains. A domain can also enforce or override an expression in one of its child domains.

One form of expressions that can be imposed includes rules. A device has an associated set of rules, called a "rule base," that it will execute when it has a task to perform. The rule base is an ordered list of rules that the device executes to determine how to perform the task. For example, in the case of a firewall device, the firewall device may execute the list of rules in the rule base every time a packet is received to determine whether to accept or deny the packet.

Rules may be declared within different domains of the hierarchy. Rules in a parent domain may be imposed on devices in child domains. In one implementation, the rule base for a device may include the collection of rule sets that are declared at different levels of the hierarchy. The rule base may be determined and provided to the device at the time of configuring the device. For example, at configuration time, the rules from the domain with which the device is associated and the parent domain(s) may be combined, put in the correct order, and pushed to the device.

Returning to the exemplary diagram of FIG. 4, the rule base for a device within the marketing department subdomain may include a combination of sets of rules from the marketing department subdomain, the North America division subdomain, the entity A domain, and the global domain. The rule sets may be ordered based on the domain in which they were declared. For example, rule sets associated with parent domains may ordered higher than (e.g., given priority over) rule sets associated with child domains. In this case, the rule base for the device in the marketing department subdomain might resemble:

---
Rule Set from Global Domain
Rule Set from Entity A Domain
Rule Set from North America Division Subdomain
Rule Set from Marketing Department Subdomain
---

Domains may declare pre-rules and post-rules. A pre-rule is a rule that is executed prior to other rules. A post-rule is a rule that is executed after other rules. Consider the same example given above, except that in this case, each of the parent domains declares some pre-rules as well as some post-rules. In this case, the rule base for the device in the marketing department subdomain might resemble:

---
Pre-rules from Global Domain
Pre-rules from Entity A Domain
Pre-rules from North America Division Subdomain
Rule Set from Marketing Department Subdomain
Post-rules from North America Division Subdomain
Post-rules from Entity A Domain
Post-rules from Global Domain
---

In addition to rules, expressions can be defined at a domain and analyzed or evaluated at the child domains. For example, assume that administrator Carly in the quality assurance department subdomain in FIG. 4 wants to create another administrator and give that administrator the ability to view logs and configure devices. Suppose that an expression at the entity A domain indicates that no one should have the ability to both view logs and configure devices. In this case, Carly cannot create a new administrator and give that administrator the ability to view logs and configure devices because this would be contrary to the expression declared at the entity A domain.

CONCLUSION

Systems and methods consistent with the principles of the invention may facilitate the management of network devices associated with one or more entities using hierarchical modeling and the notion of domains.

The foregoing description of preferred embodiments of the invention provides illustration and description, but is not intended to be exhaustive or to limit the invention to the precise form disclosed. Modifications and variations are possible in light of the above teachings or may be acquired from practice of the invention.

For example, while a series of acts has been described with regard to FIG. 7, the order of the acts may differ in other implementations consistent with the principles of the invention. Also, non-dependent acts may be performed in parallel.

It will also be apparent to one of ordinary skill in the art that aspects of the invention, as described above, may be implemented in many different forms of software, firmware, and hardware in the implementations illustrated in the figures. The actual software code or specialized control hardware used to implement aspects consistent with the principles of the invention is not limiting of the present invention. Thus, the operation and behavior of the aspects were described without reference to the specific software code—it being understood that one of ordinary skill in the art would be able to design software and control hardware to implement the aspects based on the description herein.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed:

1. A method, performed by one or more devices, in a network including network devices, administrators, and objects, the method comprising:
    forming, by the one or more devices, a hierarchical tree of domains that semantically organize the network, each of the domains including logical groupings of the network devices, the administrators, or the objects;
    managing, by the one or more devices, the network based on the hierarchical tree of domains, where managing the network includes:
        determining that a first administrator, of the administrators, is attempting to perform an activity within a first domain of the domains in the hierarchical tree,
        performing a first determination of whether a first permission assigned to the first administrator in the first domain identifies the attempted activity,
        performing a second determination, when a result of the first determination does not identify the attempted activity, whether a second permission, assigned to the first administrator in a first parent domain to the first domain, identifies the attempted activity, where the first parent domain provides expressions corresponding to first pre-rules and first post-rules associated with the identified activity, and
        permitting, when a result of the second determination identifies the attempted activity, the first administrator to perform the identified activity within the first domain in the hierarchical tree, where a network device within the first domain includes a set of rules associated with the identified activity, and where a second parent domain, to which the first parent domain is a child, provides expressions corresponding to second pre-rules and second post-rules associated with the identified activity; and
    permitting, by the one or more devices, execution in order, by the network device within the first domain, of the second pre-rules, the first pre-rules, the set of rules, the first post-rules, and the second post rules.

2. The method of claim 1, where the network devices are associated with a plurality of independent companies, each of the companies being associated with at least one of the domains in the hierarchical tree.

3. The method of claim 1, where the network devices are associated with a single company with offices in different geographic locations, at least some of the offices being associated with different ones of the domains in the hierarchical tree.

4. The method of claim 1, where managing the network further comprises:
   declaring one of the objects, defined at a second one of the domains, as shared, and
   permitting any child domain related to the second domain in the hierarchical tree to access the object.

5. The method of claim 4, where managing the network further comprises:
   changing the object in the second domain, and
   reflecting the change to the object in any child domain related to the second domain in the hierarchical tree.

6. The method of claim 1, where at least some of the objects are declared as shared as defined at the domains, an object that is declared as shared as defined at a second domain, of the domains, being made available within the second domain and any child domain related to the second domain in the hierarchical tree.

7. The method of claim 1, where managing the network further comprises:
   identifying an expression within at least one of the domains in the hierarchical tree, and
   imposing the expression on any child domain related to the at least one domain in the hierarchical tree.

8. The method of claim 7, where the expression includes at least one of a rule, a configuration parameter, a login control, or a constraint.

9. The method of claim 1, where at least some of the expressions provided by the second parent domain is imposed within the first parent domain and any child domain related to the first domain in the hierarchical tree.

10. A management system, comprising:
    a memory device to store a hierarchical tree of domains that represent a structure of an entity, the domains including information regarding groups of devices, administrators, and objects associated with the entity, where each of the domains includes at least one of the devices, at least one of the administrators, or at least one of the objects; and
    a processor to manage the devices, administrators, and objects, based on the hierarchical tree of domains, by:
      determining that an activity, that one of the administrators is attempting to perform within a first one of the domains, is not identified in a first permission assigned to the one administrator for the first domain,
      determining that the attempted activity is identified in a second permission assigned to the one administrator for a first parent domain of the first domain, where the first parent domain provides expressions corresponding to first pre-rules and first post-rules associated with the identified activity, and
      permitting the one administrator to perform the identified activity, using the at least one of the devices within the first domain in the hierarchical tree, where the at least one of the devices includes a set of rules associated with the identified activity, where a second parent domain, to which the first parent domain is a child, provides expressions corresponding to second pre-rules and second post-rules associated with the identified activity, and where the at least one of the devices executes, in order, the second pre-rules, the first pre-rules, the set of rules, the first post-rules, and the second post rules.

11. The management system of claim 10, where semantic relationships exist between ones of the domains in a same branch of the hierarchical tree.

12. The management system of claim 10, where the entity is one of a plurality of entities associated with a plurality of independent companies, each of the companies being associated with at least one of the domains in the hierarchical tree.

13. The management system of claim 10, where the entity is associated with a single company with offices in different geographic locations, at least some of the offices being associated with different ones of the domains in the hierarchical tree.

14. The management system of claim 10, where the processor further:
    determines that one of the objects is defined at a second one of the domains as shared, and
    permits any child domain related to the domain in the hierarchical tree to access the object.

15. The management system of claim 14, where the processor further:
    receives a change to the object in the second domain, and
    reflects the change to the object in any child domain related to the second domain in the hierarchical tree.

16. The management system of claim 10, where at least some of the objects are declared as shared as defined at the domains, an object that is declared as shared as defined at a second one of the domains being made available within the second domain and any child domain related to the second domain in the hierarchical tree.

17. The management system of claim 10, where the processor is configured further:
    identifies an expression within at least one of the domains in the hierarchical tree, and
    imposes the expression on any child domain related to the at least one domain in the hierarchical tree.

18. The management system of claim 17, where the expression includes at least one of a rule, a configuration parameter, a login control, or a constraint.

19. The management system of claim 10, where at least some of the expressions provided by the second parent domain is imposed within the first parent domain and any child domain related to the first domain in the hierarchical tree.

20. A management system, comprising:
    a memory device to store a hierarchical tree of domains that represent a structure of an entity, the domains including information regarding logical groupings of devices, administrators, and objects associated with the entity; and
    a processor to:
      determine that an administrator is attempting to perform an activity using a particular device within a domain, where the particular device includes a set of rules associated with the attempted activity,
      perform a first determination of whether a first permission, assigned to the administrator in the domain, identifies the attempted activity, the domain being related to a parent domain in the hierarchical tree,
      perform a second determination, when a result of the first determination does not identify the attempted activity, of whether a second permission, assigned to the administrator in the first parent domain, identifies the attempted activity, where the first parent domain provides expressions corresponding to first pre-rules and first post-rules associated with the identified activity, and where a second parent domain, to which the first parent domain is a child, provides expressions corresponding to second pre-rules and second post-rules associated with the identified activity, and permit, when a result of the second determination identifies the attempted activity, the administrator to perform the identified activity using the particular device to execute, in order, the second pre-rules, the first pre-rules, the set of rules, the first post-rules, and the second post rules, within the domain.

21. The management system of claim 20, where the domain is also related to a grandchild domain in the hierarchical tree, and where the processor is further to permit the administrator to also perform the activity in the grandchild domain.

22. The management system of claim 20, where the activity is related to one of fault management, configuration management, accounting management, performance management, or security management.

23. The management system of claim 20, where the activity is related to one of fault management, assurance management, billing management, or security management.

24. A management system, comprising:

a memory device to store a hierarchical tree of domains that represent a structure of a network, the domains including information regarding groups of security devices that connect together in the network to control access to the network, administrators who manage or monitor the security devices, and objects that provide reusable information for the security devices, one of the domains including a plurality of the security devices, a plurality of the administrators, or a plurality of the objects; and a processor to manage the network based on the hierarchical tree of domains, where the processor is to:

determine that one administrator, of the administrators, is attempting to perform an activity using a particular security device within the one domain, where the particular security device includes a set of rules associated with the attempted activity, and where a first parent domain, to which the second parent domain is a child, provides expressions corresponding to first pre-rules and first post-rules associated with the identified activity, determine whether a first permission assigned to the one administrator in the one domain identifies the attempted activity, determine, upon the determination that the first permission does not identify the attempted activity, whether a second permission assigned to the one administrator in the second parent domain of the one domain, identifies the attempted activity, where the second parent domain provides expressions corresponding to second pre-rules and second post-rules associated with the identified activity, permit, upon the determination that the second permission identifies the attempted activity, the one administrator to perform the identified activity, using the particular security device to execute, in order, the second pre-rules, the pre-rules, the set of rules, and the post-rules, and the second post rules, and not permit, upon the determination that the second permission does not identify the attempted activity, the one administrator to perform the attempted activity within the one domain.

\* \* \* \* \*

UNITED STATES PATENT AND TRADEMARK OFFICE
CERTIFICATE OF CORRECTION

| | | |
|---|---|---|
| PATENT NO. | : 8,078,707 B1 | Page 1 of 1 |
| APPLICATION NO. | : 10/986159 | |
| DATED | : December 13, 2011 | |
| INVENTOR(S) | : Kent Andrew Watsen et al. | |

It is certified that error appears in the above-identified patent and that said Letters Patent is hereby corrected as shown below:

In the Claims:

Column 12, line 41, Claim 19, after "domain", delete "is" and insert --are--

Signed and Sealed this
Fourteenth Day of February, 2012

David J. Kappos
*Director of the United States Patent and Trademark Office*